Feb. 9, 1937. S. SCHNELL 2,070,298
VERTICAL MASTER CYLINDER
Filed March 18, 1935
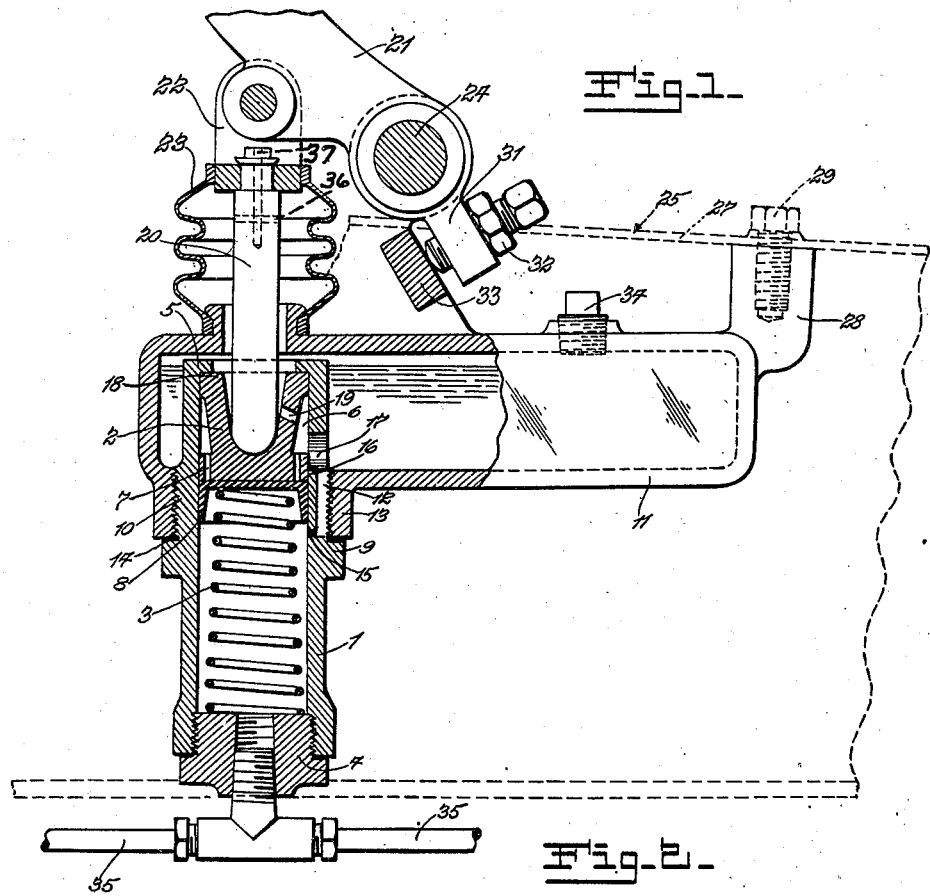
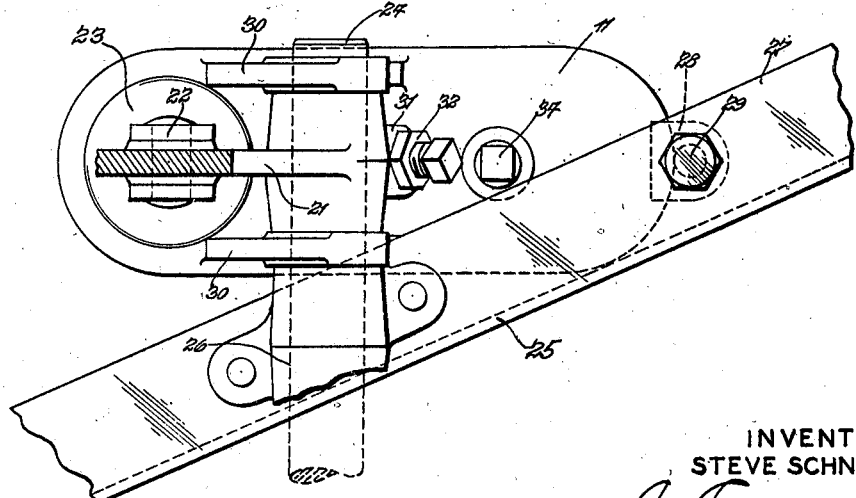
INVENTOR
STEVE SCHNELL
BY [signature] Huffman
ATTY.

Patented Feb. 9, 1937

2,070,298

UNITED STATES PATENT OFFICE 2,070,298

VERTICAL MASTER CYLINDER

Steve Schnell, Overland, Mo., assignor to Wagner Electric Corporation, St. Louis, Mo., a corporation of Delaware Application March 18, 1935, Serial No. 11,549

7 Claims. (Cl. 60—54.6)

My invention relates to fluid braking apparatus and more particularly to a vertical master cylinder device for creating pressure in a fluid brake actuating system.

One of the objects of my invention is to produce an improved master cylinder device of the vertically positioned type which is simple in construction, economical to manufacture and assemble, efficient in operation, and easy to install on a vehicle.

Other objects will become apparent from the following description taken in connection with the accompanying drawing in which Figure 1 is a partial cross sectional view of my improved master cylinder device, and Figure 2 is a top view thereof.

Referring to the drawing in detail, the vertically positioned cylinder 1 is provided with a piston 2 which piston is normally maintained at the rear of the cylinder by a coil spring 3 interposed between the piston head and the cylinder head 4, the latter being threaded in the cylinder for easy assembly and disassembly. The rear end of the cylinder is provided with an integral flange 5 which acts as a stop for the piston when it is in its normally retracted position under the action of spring 3. This stop may, if desired, be detachable instead of integral as shown. The piston is formed with an annular recess 6, thereby forming, with the cylinder wall, an annular fluid containing chamber, the purpose of which will be later apparent.

The head of the piston has formed therein a plurality of passages 7 for placing the annular recess 6 in communication with the portion of the cylinder ahead of the piston. The rear of the piston cooperates with the cylinder to form guiding means during the reciprocation of the piston. The piston is also shown as being provided with the usual rubber packing cup 8 adjacent the head of the piston, such packing cup being maintained in contact with the piston head by means of spring 3.

The exterior of the cylinder 1 has formed thereon an annular flange 9 and a threaded portion 10 adjacent and above the flange. The reservoir casing 11 for the master cylinder device is provided in its bottom with a threaded opening 12 through which extends the upper portion of the cylinder 1, into the reservoir casing 11. The opening 12 is strengthened by means of a boss 13 and the threads thereon, together with the threads of the opening 12, cooperate with the threaded portion 10 of the cylinder to detachably connect the cylinder and the reservoir casing. A suitable gasket 14 is interposed between the boss 13 and the annular flange 9 on the cylinder to efficiently seal the reservoir casing and cylinder together.

The cylinder 1 is formed with an opening 15 commonly known as the "compensating port", this opening being positioned ahead of the lip of the packing cup when the piston and packing cup are in fully retracted position against the piston stop 5. This compensating port is at all times in communication with the reservoir by means of a groove 16 cut through the threads on the threaded portion 10 of the cylinder. The portion of the cylinder which extends into the reservoir casing has formed therein an opening 17 for placing the annular recess 6 of the piston in constant communication with the reservoir. The piston is formed with a piston rod receiving socket 18 which is in communication with the annular recess of the piston by the passage 19.

The piston rod 20 is adapted to loosely abut the piston and extends through an enlarged opening in the top of the reservoir casing for connection with the brake pedal 21 by means of a clevis 22. A suitable flexible dust excluding boot 23 surrounds the piston rod and has one end connected to the clevis and the other end clamped to a suitable annular flange surrounding the piston rod opening in the top of the reservoir. Breathing means for the boot and the reservoir is formed in the piston rod instead of in the boot wall and comprises a cross passage 36 and a connecting longitudinal passage 37 extending to the atmosphere at the outer end of the piston rod. By this construction the breather opening is well protected from foreign material because of its location directly beneath the pedal.

The brake pedal 21 is pivotally mounted upon the shaft 24, which shaft is mounted upon support 25 of the vehicle by a bearing 26. The support 25 is a portion of the frame of the vehicle and is in the form of an angle iron having a top flange 27 adapted to carry and support the master cylinder device. As shown in the drawing, the reservoir casing has formed thereon a boss 28 which fits up against flange 27 of the support and is clamped thereto by a bolt 29. The reservoir casing is also provided with a pair of trunnions 30 adapted to surround the shaft 24 and to additionally support the master cylinder device from flange 27 of the support by means of shaft 24. The brake pedal 21 is provided with a short extension 31 carrying a set-screw 32 which is adapted to cooperate with a stop 33 on the top of the reservoir casing, thus providing adjustable stop means for the brake pedal. The reservoir casing is also shown as being provided with a filler opening closed by means of a suitable plug 34.

In the operation of my improved master cylinder device the lower end of the cylinder is connected to the wheel cylinders of the brakes (not shown) by conduits 35 and the entire system is filled with a suitable liquid, the air in the system being removed in a well-known manner. When the pedal 21 is actuated, the piston rod 20 forces the piston 2 downwardly, thereby cutting off the compensating port 15 and forcing fluid under pressure through conduits 35 to actuate the brakes. When the pedal is released, the spring 3 will move piston 2 to its normally retracted position against the stop 5. If, for any reason, the piston should be returned more rapidly than fluid is returned to the cylinder from the brake applying cylinders, thereby tending to create a sub-atmospheric pressure in the cylinder ahead of the piston, the fluid in the annular recess of the piston will flow through piston passages 7 and around the lip of the cup to maintain the cylinder filled with liquid. Air is thus prevented from being drawn into the system during retractile movement of the piston, since, due to the position of the reservoir above the piston, liquid will always be maintained at the rear of the piston head because the annular recess 6 is at all times in communication with the reservoir by way of opening 17. When the piston assumes its retracted position the compensating port 15 will be uncovered and any excess liquid in the cylinder will be returned to the reservoir by way of groove 16.

An important feature of my invention is the position of the reservoir with respect to the compensating port or opening 15. It is to be noted from the drawing that this port is below the bottom of the reservoir casing, thus the compensating port and the groove connected thereto will always be fed with liquid as long as there is any liquid in the reservoir. In all other master cylinders of the vertical type of which I have knowledge, a certain amount of liquid may be in the reservoir but at the same time the compensating port, due to its position, will be dry, thus allowing air to enter the system and thereby decrease its efficiency. The positioning of the reservoir as shown, and the provision of passage 19 in the piston, also insures that liquid will be maintained in the piston rod receiving socket of the piston for lubricating purposes. Another important feature of my invention is that by positioning the reservoir as shown, a considerable saving in reservoir material is accomplished. Also, since the master cylinder device is composed of only two parts, they are readily assembled and disassembled by merely screwing them together or unscrewing them. There is also no problem present in this device to insure that the rear of the cylinder and the piston rod be sealed to prevent leakage of liquid from the cylinder and the reservoir casing. The level of the liquid in the reservoir is at all times below the piston rod opening in the top wall of the reservoir casing.

The cylinder is preferably of cast construction, while the reservoir may be either made of cast material or of pressed steel as desired.

From the foregoing description it will be readily seen that the device is very quickly installed in a vehicle. All that is necessary is to slide the pedal and the trunnions 30 on to the shaft 24 and then clamp the reservoir to flange 27 by means of bolt 29 to produce very rigid installation. The entire device is compact, requiring only a very small over-all space.

Having fully described my invention, what I claim as new and desire to secure by Letters Patent of the United States is:

1. In a master cylinder device, a reservoir casing provided with a threaded opening in its bottom, a vertically positioned cylinder provided with an annular flange and a threaded portion intermediate its ends, the upper end of said cylinder extending into the reservoir casing and the threaded portion cooperating with the threaded reservoir opening to clamp the annular flange in fluid-tight engagement with the bottom of the reservoir casing, a piston reciprocable in the cylinder, said cylinder being provided with an opening positioned below the bottom of the reservoir and ahead of the piston when the piston is in its retracted position, and means forming a groove in one of the cooperating threaded portions of the cylinder and reservoir casing for placing the bottom of the reservoir casing in communication with the cylinder opening.

2. In a vertically positioned master cylinder device, a support, a vertical cylinder, a piston reciprocable therein, a reservoir casing secured to the cylinder, a shaft mounted on the support, a pedal mounted on the shaft, a piston rod connected to the pedal and operatively connected to the piston, means carried by the reservoir casing for suspending the reservoir from the shaft, and means for connecting another portion of the reservoir casing to the support whereby the reservoir and cylinder are prevented from turning about the shaft when the piston is actuated by the pedal.

3. In a vertically positioned master cylinder device, a support, a vertical cylinder, a piston reciprocable therein, a reservoir casing secured to the cylinder, a shaft mounted on the support, a pedal, a pedal mounted on the shaft, a piston rod connected to the pedal and operatively connected to the piston, means carried by the reservoir casing for suspending the reservoir from the shaft, means for connecting another portion of the reservoir casing to the support whereby the reservoir and cylinder are prevented from turning about the shaft when the piston is actuated by the pedal, and cooperating means carried by the pedal and the reservoir casing and providing a stop for the pedal.

4. In a master cylinder device for fluid pressure brakes, a cylinder, a piston therein, a piston rod, means for actuating the piston rod, an imperforate boot having one end sealed to the piston rod and the other end sealed to the cylinder, and means for permitting air to circulate in and out of the boot during actuation of the piston rod, said means comprising a cross-passage in the piston rod within the interior of the boot and a longitudinal passage in the piston rod communicating at one end with the cross-passage and at its other end with the atmosphere at a protected point between the piston rod and the actuating means therefor.

5. In a master cylinder device for fluid pressure brakes, a vertically positioned cylinder, a piston reciprocable therein, a piston rod, a brake pedal above the outer end of the piston rod, means for connecting the end of the piston rod to the pedal, an imperforate boot having one end sealed to the piston rod and the other end sealed to the cylinder, and means for permitting air to circulate in and out of the boot during actuation of the piston, said means comprising a passage in the piston rod placing the interior of the boot in communication with the atmosphere at a point beneath the brake pedal.

6. In a master cylinder device, a reservoir casing provided with a threaded opening, a separable cylinder provided with an annular flange and a threaded portion adjacent thereto, one end of said cylinder extending into the reservoir casing and the threaded portion cooperating with the threaded reservoir opening to clamp the annular flange in fluid-tight engagement with the external wall of the reservoir casing, a piston reciprocable in the cylinder, said cylinder being provided with an opening in its wall at a point without the interior surface of the wall of the reservoir casing and ahead of the piston when the piston is in retracted position, and means forming a groove in one of the cooperating threaded portions of the cylinder and reservoir casing for placing the interior of the reservoir casing in communication with the cylinder opening.

7. In a master cylinder device, a reservoir casing provided with an opening, a separable cylinder having a portion extending into the casing through said opening and being provided with a flange for cooperation with the exterior surface of the casing surrounding the casing opening, means for clamping the flange in fluid-tight engagement with the casing, a piston reciprocable in the cylinder, said cylinder being provided with an opening in its wall at a point without the interior surface of the wall of the reservoir casing and ahead of the piston when the piston is in retracted position, and means forming a groove in one of the adjacent cooperating surfaces of the cylinder and the casing opening for placing the interior of the reservoir casing in communication with the cylinder opening.

STEVE SCHNELL.